Nov. 6, 1934.　　　H. M. CAMERON　　　1,979,822

FORCE MEASURING MACHINE

Filed June 20, 1930　　2 Sheets-Sheet 1

INVENTOR
HUGH M. CAMERON
BY
J. S. Wooster
ATTORNEY

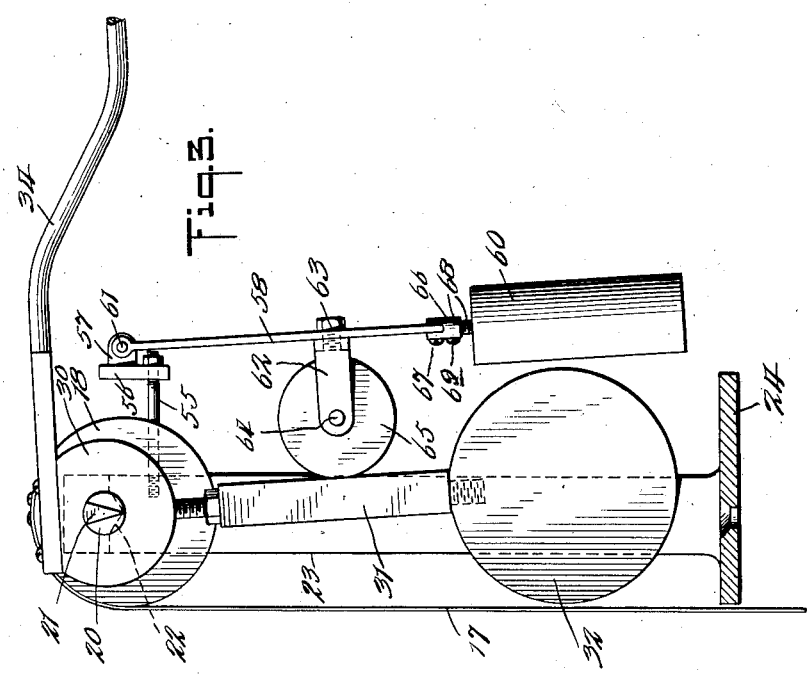
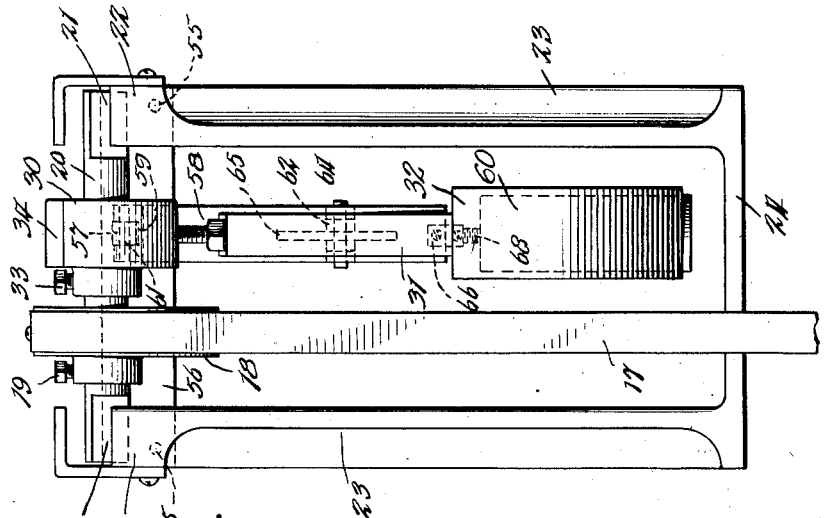

Patented Nov. 6, 1934

1,979,822

UNITED STATES PATENT OFFICE 1,979,822

FORCE MEASURING MACHINE

Hugh M. Cameron, Woodhaven, N. Y., assignor to John Chatillon & Sons, New York, N. Y., a corporation of New York Application June 20, 1930, Serial No. 462,682

7 Claims. (Cl. 265—62)

This invention relates to force measuring machines and more particularly to automatic machines or scales of the type wherein the counterbalancing means comprises a pendulum.

An object of this invention is to provide an improved force measuring machine of compact construction and great accuracy. A further object is to provide a force measuring machine or scale construction wherein the indicating means may be considerably larger and of greater weight than indicating means heretofore possible in like machines of similar size.

Heretofore, force measuring machines such as scales employing an automatic pendulum counterbalancing means have been materially limited in size of the weight indicator, i. e., pointer, disc, cylinder, etc., where it is desired to have said indicator move equal distances for equal units of applied weight, such indicator movement being practically a necessity in scales acceptable to the trade today. The reason for this was due to the fact that the distance of travel of the pendulum used to counterbalance the load, that could be corrected by means heretofore known, was very limited and, therefore, the pinion or equivalent means through which the indicator was driven, was also limited so that its circumference was not greater than the corrected distance of travel of the pendulum where it was desired to turn the indicator a full revolution. This necessarily limited the size of the pointer, disc, etc. due to the inadequate leverage afforded by the small pinions through which the indicator was driven.

An object of the present invention is to increase the corrected travel distance of a counterbalancing pendulum and thereby enable a pinion of considerably greater diameter than those heretofore used, to be used through which the indicator is driven, thereby permitting an indicator of greater weight and size to be used without changing in other respects the size of the machine or movement of the levers in operation.

These objects are accomplished in the present invention by compensating the known progressive increase of travel distance per equal units of applied force or weight in a load or force counterbalancing pendulum moving away from the vertical by means of a secondary pendulum adapted to oppose movement of said first pendulum and progressively increase the force with which it opposes said movement of the first pendulum in proportion to the tendency of the first pendulum to progressively increase its travel distance per equal units of applied force or weight as it moves from vertical position, whereby the composite counterbalancing pendulum means is made to move equal distances per equal units of applied force or weight. With this counterbalancing means, a flexible tape is attached to the leverage system of the scale or any load supporting or force applying device, and to a true-centered wheel pivoting about the same axis as said primary pendulum.

It is a known fact that a pendulum with a true wheel drive and tape leaving the periphery always at the same point where said point is on the same horizontal line as the pendulum bearing, will give a progressively increasing travel distance on the arc through which it travels for each equal unit of weight or force applied to the tape. It is this progressive increase of travel distance that is corrected by the secondary pendulum in the present invention.

The travel distance of the pendulum that can be corrected in this manner is considerably greater than the travel distance that can be used in the known automatic scales where the so called lever "errors" and pendulum "error" are corrected by the use of a cycloidal cam, or an eccentric cam.

Other objects and advantages of the invention will be apparent in the following description in which reference is had to the accompanying drawings illustrating the preferred embodiment of my invention in a weighing scale and wherein similar reference numerals designate similar parts throughout the several views.

In the drawings:

Fig. 2 is an enlarged side elevation showing the counterbalancing means in Fig. 1;

Fig. 3 is an enlarged front elevation of the counterbalancing means shown in Figs. 1 and 2.

Figure 1:
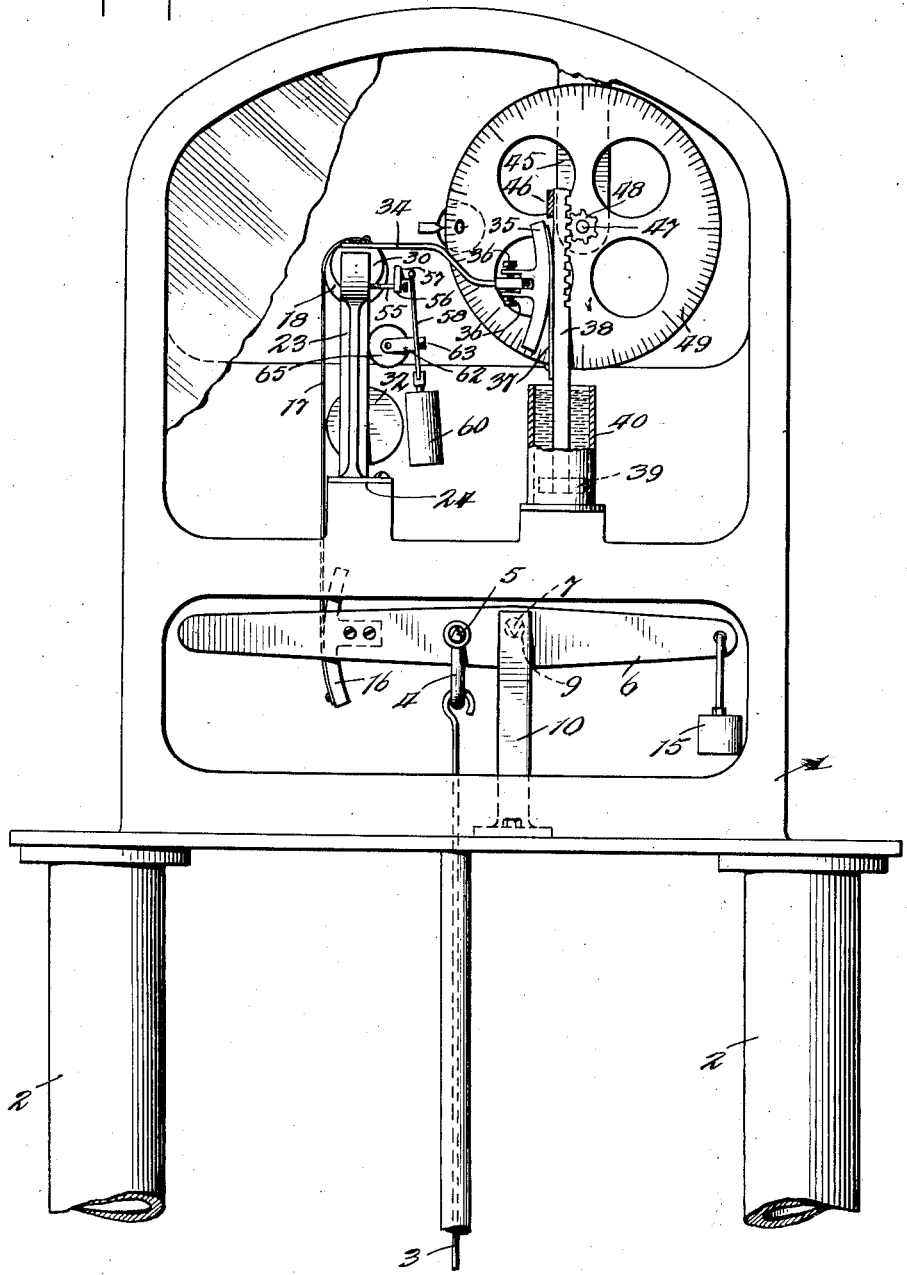
Fig. 1 is a front elevational view of a scale embodying one form of my invention, parts being broken away for the sake of clarity.

In the scale illustrated in the drawings, 1 designates the casing which houses the scale mechanism except for the load platform. This housing is supported on posts 2 of the base of the scale. The load platform and base of the scale may be of any conventional design and are not illustrated here. The steelyard rod 3, connected at its lower end to any conventional leverage upon which the load platform is carried, is attached to yoke 4 pivoted on oppositely disposed knife edges 5 on the weighing lever 6. The lever 6 carrying the oppositely disposed knife edges 7, is pivoted on the main knife edge bearings 9 of the U-shaped frame member 10, mounted on the floor of casing 1. A counterweight 15 is disposed on one end of the lever 6.

An arcuate member 16 is rigidly fastened to lever 6 beyond the point of application of the load to lever 6 from the fulcrum of said lever. A flexible tape 17 is anchored at the lower end of the face of arcuate member 16 and to the periphery of a circular wheel 18 held by the locknut 19 in fixed position on the shaft 20, provided with knife edges 21 resting in the knife edge bearings 22 of the standards 23 carried by a crossframe member 24. As clearly illustrated in Fig. 3, the axis of the pivot of shaft 20 passes through the center of wheel 18, wheel 18 therefore being true-centered.

The shaft 20 carries in fixed relation thereto a primary pendulum comprising the collar 30, stem 31, and weight 32, the pendulum being held in fixed relation to the shaft by means of locknut 33. Extending from the collar of the pendulum is the arm 34 carrying at its opposite end the arcuate member 35, the position of which with relation to the arm may be adjusted by the adjusting screws 36. A flexible tape 37 is anchored at one end to the top of the arcuate member 35 and at the other end to the rack 38 carrying at its lower end a piston 39 cooperating with the dash-pot 40. The casing 1 is provided with a depending arm 45 carrying the guide member 46 with which the rack 38 cooperates. A shaft 47 is journaled in a bearing in the arm 45 and carries fixed at one end a pinion 48 cooperating with the rack 38 and at the other end an indicator disc 49, in this case a disc having its outer edge graduated. This type of indicator is particularly adapted for use in the so called "projecting type" of scale, such as in my Patent #1,806,742, issued May 26, 1931.

A pair of horizontally extending bolts 55 are fixed in the standards 23 and carry at their outer end the frame member 56. This frame member 56 is provided with an extending ear 57 with a bearing therein. A secondary pendulum comprising the stem 58, bifurcated at 59, and weight 60 is pivotally mounted on the pin 61, passing through the bearing in the ear 57 and through bearings formed in each portion of the bifurcated end of stem 58. The axes of the pivots of the primary pendulum and the secondary pendulum are parallel and on a horizontal line. On the stem 58 of the secondary pendulum is disposed the U-shaped bracket member 62 held in position by bolt 63 and provided with bearings in the outer end of its arms through which the shaft 64 is passed on which is mounted the wheel 65. When the primary pendulum is vertical, the secondary pendulum will also lie in a vertical position and the wheel 65 will touch the stem 31 of the primary pendulum but will exert no pressure thereagainst. As the tape 17 is pulled down by a load placed on the load platform it will tend to turn the shaft 20, thereby swinging the primary pendulum to the right, viewing Figs. 1 and 3. As this pendulum moves to the right it will also move the secondary pendulum to the right by engagement with the wheel 64. The secondary pendulum is free swinging except for its contact with the primary pendulum. Obviously, as the secondary pendulum is pivoted at a point to the right of the pivot of the primary pendulum, as said primary pendulum moves to the right the point at which the wheel 65 engages the stem 31 of the primary pendulum will gradually approach the lower end of said primary pendulum, thereby progressively increasing the force with which the secondary pendulum opposes movement of the primary pendulum to the right as it counterbalances the load. By proportioning the relative weight and effective length of the two pendulums, this progressively increasing force by which movement of the primary pendulum is opposed can be made to exactly counteract for the tendency of the primary pendulum to increase its travel distance progressively per equal units of applied weight as it moves from vertical position.

Obviously, the U-shaped bracket member 62 and associated parts could be carried by the stem 31 of the primary pendulum instead of by the stem 58 of the secondary pendulum without changing the combined effect of the two pendulums.

To facilitate adjustment of the length of the secondary pendulum with respect to the primary pendulum, the stem 58 of the secondary pendulum is connected with the weight 60 by means of a coupling member 66 held on stem 58 by screw 67 and connected to weight 60 by threaded stem 68 carried by weight 60 and screwed into a threaded recess in member 66. The set screw 69 holds the threaded stem 68 in position once it is adjusted.

From the foregoing description it will be apparent that equal units of weight applied to the platform of the scale and effecting a stress on the tape 17 will cause the counterbalancing means to move equal travel distances and consequently the movement of the arm 34 will be in direct proportion to the load applied and the indicator driven through a true rack 38 and pinion 48 will likewise be moved in direct proportion to load applied.

The scale described herein is now considered to represent the best embodiment of the invention but is only illustrative and it is to be understood that the invention can be carried out by other means.

In scales and other force measuring machines according to the present invention not only can the so called "error" in the primary pendulum be corrected by the secondary pendulum but also all lever errors up to the point at which the counterbalancing means is interconnected in the leverage system.

The invention claimed is:

1. A force measuring machine comprising an indicator, a force resisting system connected thereto comprising a suspended primary pendulum, a secondary pendulum suspended in position to be moved by the primary pendulum and means intermediate the ends of one pendulum contacting with and traveling along the other pendulum, whereby as the load is applied the secondary pendulum opposes movement of the primary pendulum with progressively increasing force.

2. A force measuring machine comprising an indicator, a force resisting system connected thereto comprising a suspended primary pendulum, a secondary pendulum suspended in the same horizontal plane as the primary pendulum and means intermediate the ends of one pendulum contacting with and traveling along the other pendulum, whereby as the load is applied the secondary pendulum opposes movement of the primary pendulum with progressively increasing force.

3. A force measuring machine comprising an indicator, a force resisting system connected thereto comprising a suspended primary pendulum, a secondary pendulum suspended in the same horizontal plane as the primary pendulum and means intermediate the ends of the secondary pendulum contacting with and traveling along the primary pendulum, whereby as the load is applied the secondary pendulum opposes movement of the primary pendulum with progressively increasing force.

4. A force measuring machine comprising an indicator, a force applying device, a force counterbalancing mechanism which comprises a shaft, a true-centered wheel fixed on said shaft, a flexible tape anchored at one end on the periphery of said wheel and operatively connected to the force applying device, a primary pendulum carried by said shaft, a secondary pendulum depending from a second shaft parallel to and in the same horizontal plane as said first shaft, a member fixed on one of said pendulums intermediate its ends and adapted to abut against the other of said pendulums intermediate its ends whereby said secondary pendulum opposes movement of said primary pendulum with progressively increasing force as said primary pendulum moves from vertical position upon application of force, and means operatively connecting said counterbalancing mechanism with the indicator.

5. A force measuring machine comprising an indicator, a force applying device, a force counterbalancing mechanism which comprises a shaft pivoted on knife edges extending parallel to said shaft, a wheel carried by said shaft and true-centered with respect to the pivotal axis of said shaft, a flexible tape anchored at one end on the periphery of said wheel and operatively connected to the force applying device, a primary pendulum carried by said shaft, a second shaft parallel to and in the same plane as said first shaft, a secondary pendulum of substantially the same length as said primary pendulum depending from said second shaft, a member fixed on one of said pendulums intermediate its ends and adapted to abut against the other of said pendulums intermediate its ends whereby said secondary pendulum opposes movement of said primary pendulum with progressively increasing force as said primary pendulum moves from vertical position upon application of force, and means operatively connecting said counterbalancing mechanism and said indicator.

6. A force measuring machine comprising an indicator, a force applying device, a force counterbalancing mechanism which comprises a shaft pivoted on knife edges extending parallel to said shaft, a wheel carried by said shaft and true-centered with respect to the pivotal axis of said shaft, a flexible tape anchored at one end on the periphery of said wheel and operatively connected to the force applying device, a primary pendulum carried by said shaft, a second shaft parallel to and in the same plane as said first shaft, a secondary pendulum of substantially the same length as said primary pendulum depending from said second shaft, a member fixed on one of said pendulums intermediate its ends and adapted to abut against the other of said pendulums intermediate its ends whereby said secondary pendulum opposes movement of said primary pendulum with progressively increasing force as said primary pendulum moves from vertical position upon application of force, a substantially horizontal arm fixed with relation to said first shaft, an arcuate member carried by the end of said arm, a rack adapted to actuate said indicator, and a flexible tape connecting said arcuate member and said rack.

7. A force measuring machine comprising an indicator adapted to travel equal distances for equal units of applied weight, a force applying device, a force counterbalancing mechanism which comprises a shaft, a true-centered wheel fixed on said shaft, a flexible tape anchored at one end on the periphery of said wheel and operatively connected to the force applying device, a primary pendulum carried by said shaft, a second shaft parallel to and in the same horizontal plane as said first shaft, a secondary pendulum depending from said second shaft, a member fixed on one of said pendulums intermediate its ends and adapted to abut against the other of said pendulums intermediate its ends whereby said secondary pendulum opposes movement of said primary pendulum with progressively increasing force as said primary pendulum moves from vertical position upon application of force, an arm fixed with relation to said first shaft, and means including a true rack and pinion by which movement of said arm drives the indicator.

HUGH M. CAMERON.